United States Patent
Widenmeyer et al.

(10) Patent No.: US 9,291,205 B2
(45) Date of Patent: Mar. 22, 2016

(54) CLAMP COUPLING FOR FIXED CONNECTION OF TWO ROTATING PARTS, PREFERABLY SHAFT AND HUB

(75) Inventors: Thomas Widenmeyer, Pforzheim/Huchenfeld (DE); Artur Wagner, Remchingen (DE)

(73) Assignee: Stöber Antriebstechnik GmbH & Co. KG, Pforzheim (DE)

( * ) Notice: Subject to any disclaimer, the term of this patent is extended or adjusted under 35 U.S.C. 154(b) by 82 days.

(21) Appl. No.: 13/413,689

(22) Filed: Mar. 7, 2012

(65) Prior Publication Data
US 2012/0230758 A1    Sep. 13, 2012

(30) Foreign Application Priority Data

Mar. 7, 2011    (DE) .......................... 10 2011 013 887

(51) Int. Cl.
*F16B 2/06*    (2006.01)
*F16D 1/08*    (2006.01)

(52) U.S. Cl.
CPC ............ *F16D 1/0864* (2013.01); *F16D 1/0847* (2013.01); *Y10T 403/535* (2015.01); *Y10T 403/69* (2015.01); *Y10T 403/7084* (2015.01)

(58) Field of Classification Search
USPC .............. 403/109.6, 289, 290, 344, 365, 372, 403/373, 378, 379.1, 379.3, 398, 399, 362, 403/366
See application file for complete search history.

(56) References Cited

U.S. PATENT DOCUMENTS

| | | | | |
|---|---|---|---|---|
| 843,906 | A * | 2/1907 | Murchie | 403/344 |
| 2,143,005 | A * | 1/1939 | Green | 403/362 |
| 4,006,993 | A * | 2/1977 | Woerlee | 403/365 |
| 5,052,842 | A * | 10/1991 | Janatka | 403/290 |
| 5,158,407 | A * | 10/1992 | Zettl | 403/373 |
| 5,823,699 | A * | 10/1998 | Austin et al. | 403/365 |
| 6,413,006 | B1 * | 7/2002 | Neugart | 403/344 |
| 2007/0009322 | A1 * | 1/2007 | Lang et al. | 403/344 |

OTHER PUBLICATIONS

"Types of Fastener Threads." ThomasNet. May 23, 2009, [online], [retrieved on May 7, 2014] Retrieved from the Internet <URL: https://web.archive.org/web/20090523213807/http://www.thomasnet.com/articles/hardware/fastener-threads>.*

* cited by examiner

*Primary Examiner* — Josh Skroupa
(74) *Attorney, Agent, or Firm* — Gudrun E. Huckett

(57) ABSTRACT

A clamp coupling has a slotted clamping ring seated on a first rotatable part. A clamping screw is arranged in the clamping ring and acts on the clamping ring to elastically spread the clamping ring apart and contract the clamping ring depending on the turning direction of the clamping screw. The first rotatable part has axially oriented slots that extend up to a free end face of the first rotatable part and that separate coupling segments of the first rotatable part from each other. The slots are arranged in an area surrounded by the clamping ring. The coupling segments receive a second rotating part and are clamped by the clamping ring on the second rotating part. A follower part is arranged on the clamping ring and in a spreading-apart direction of the clamping ring is fixedly connected with at least one of the coupling segments.

15 Claims, 4 Drawing Sheets

CLAMP COUPLING FOR FIXED CONNECTION OF TWO ROTATING PARTS, PREFERABLY SHAFT AND HUB

BACKGROUND OF THE INVENTION

The invention relates to a clamp coupling for a fixed connection of two rotating parts, preferably a shaft and a hub. The clamp coupling comprises a slotted clamping/tightening ring that by means of a clamping screw can be elastically spread apart and is seated on the first rotating part. The first rotating part has in the area of the clamping/tightening ring axially oriented slots that extend up to the free end of the first rotating part and that separate coupling segments of the first rotating part from each other. The coupling segments of the first rotating part surround or enclose the second rotating part and can be clamped with the clamping/tightening ring on the second rotating part.

Clamp couplings serve for effecting a force-locking or frictional connection of shafts and hubs. There are one-part and two-part configurations known in the art. In the inexpensive one-part variant, the clamping ring is part of the hub while in the two-part variant it is a part that is separate from the hub. In order for the hub that is seated on the shaft to be deformed more easily, the hub has a slotted design. By means of a clamping screw that is arranged tangentially in the clamping ring, a clamping force is applied so that torque can be transmitted from the hub onto the shaft.

In the two-part variant, the hub is provided with several longitudinal slots in order to enable a more uniform force introduction into the shaft upon deformation of the clamping ring. Since several longitudinal slots are present, the coaxial arrangement and alignment of hub and shaft to be inserted are also improved. Because of the slots provided in the hub, material strain is released that may cause a slight deformation. The deformation may cause a certain non-roundness of the hub and makes insertion of the shaft into the hub more difficult.

In order to avoid non-roundness of the hub, it is known (U.S. Pat. No. 6,413,006 B1) to provide longitudinal slots that do not extend all the way up to the free end of the hub. In this way, at the end face of the hub a closed circumferential ring is formed. Because of the ring, it is however necessary to set the fit sizes such that a problem-free insertion of the shaft is still possible even for unfavorable tolerance situations, i.e., the smallest tolerance is at the hub and the greatest tolerance is at the shaft. It is then necessary however that a significant proportion of the clamping force is applied for deformation of the hub; this proportion of the clamping force is no longer available for torque transmission.

It is the object of the present invention to configure a clamp coupling of the aforementioned kind such that the two parts that are to be connected fixedly to each other, i.e., so that they cannot rotate relative to each other, can be joined without problems and ensure at the same time a proper torque transmission.

SUMMARY OF THE INVENTION

In accordance with the present invention, this is achieved in that the clamping/tightening ring is provided with at least one follower part that, in the spreading apart direction of the clamping/tightening ring is fixedly connected with at least one of the coupling segments.

In the clamp coupling according to the invention, the first rotatable part can be spread apart in order to be able to insert the second rotating part without problems. When widening or spreading apart the clamping/tightening ring, the first rotatable part is correspondingly widened or spread apart by means of the follower part. Even for an unfavorable tolerance situation (smallest tolerance at one rotating part and largest tolerance at the other rotating part), the two parts can be joined easily. In the spreading-apart direction of the clamping/tightening ring, the follower part is fixedly connected with at least one coupling part of the first rotating part. Since the slots of the first rotatable part extend up to its free end, this rotatable part can be easily elastically widened to such an extent that the second rotatable part can be inserted. The deformation of the coupling segments requires only a minimal force so that the entire clamping force of the clamping/tightening ring is available for the torque transmission.

Advantageously, the follower part is a screw that is supported within the clamping/tightening ring and is screwed into a threaded opening of the coupling segment. The follower part can thus be supported in the clamping/tightening ring and can be brought into engagement with the coupling element by a simple tightening movement of the screw.

In another embodiment, the follower part is formed by at least one profile part that is provided at the end face of the clamping/tightening ring.

In order for the coupling segments to be reliably entrained upon spreading apart of the clamping/tightening ring, the clamping/tightening ring engages about the end face of the coupling segment.

The coupling segment is advantageously provided at a first end face with a recess; the profile part of the clamping/tightening ring engages this recess.

This recess is open in radial direction toward the interior so that it can be produced easily in the coupling element.

In order for the clamping/tightening ring to be always in its optimal position on the first rotatable part, it is secured in axial direction by at least one fixation element on the first rotating part.

The fixation element can be formed by the follower part; this provides for a simple configuration.

The fixation element can however also be a screw that is supported in the clamping/tightening ring and with its free end projects into an opening of one of the coupling segments.

The head of the clamping screw of the clamping/tightening ring is preferably positioned in a recess in the outer wall surface of the clamping/tightening ring.

In order for the clamping/tightening ring to be spread apart in a simple way for joining the parts that are to be connected to each other, the head of the clamping screw can be advantageously positioned between a bottom of the recess and a stop. When the clamping screw is loosened, it is supported on the stop so that upon rotation of the clamping screw the slotted clamping/tightening ring can be spread apart and widened without problems.

The stop is formed in a preferred embodiment by a pin that penetrates the recess in which the head of the clamping screw is located transversely to the axis of the clamping screw.

Further features of the invention result from the additional claims, the description, and the drawings.

BRIEF DESCRIPTION OF THE DRAWING

The invention will be explained in more detail with the aid of two embodiments illustrated in the drawings.

DESCRIPTION OF THE PREFERRED EMBODIMENTS

By means of the clamp coupling, a rotationally fixed connection between two rotational parts is produced, i.e., the two parts are connected so that they cannot rotate relative to each other. For example, by means of the clamp coupling a hub and a shaft can be fixedly connected to each other. In this connection, the hub 10 can be a hollow shaft hub into which the shaft is inserted and fastened to the hub by means of the clamp coupling.

Figure 1:
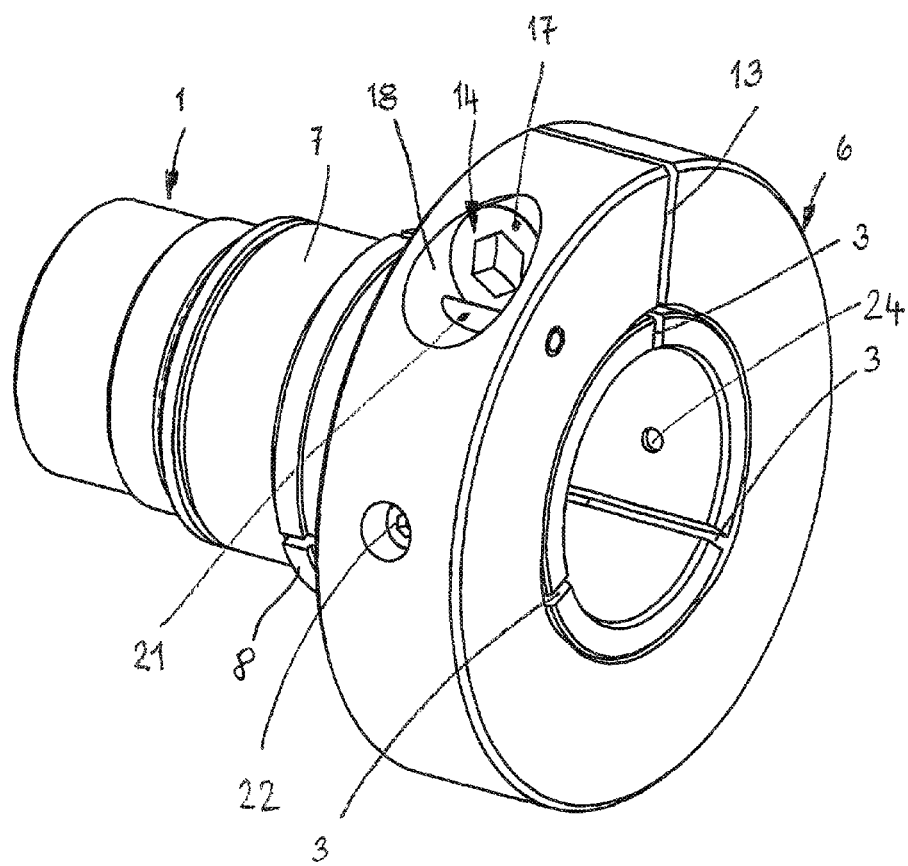
FIG. 1 is a perspective illustration of a first embodiment of the clamp coupling according to the invention.

In the illustrated embodiments, the hub is in the form of a hollow shaft 1 that has an end section 2 that is provided with at least one slot 3 extending in axial direction. The slot 3 penetrates the wall of the end section 2 and extends up to the free end face 4 of the end section 2. In the embodiment of FIG. 1, the end section 2 of the hollow shaft 1 is provided with three such slots 3 that are positioned at an angular spacing of 120 degrees relative to each other.

Between the slots 3, the end section 2 of the hollow shaft 1 has coupling segments 5 that can be contracted by means of clamping/tightening ring 6.

The hollow shaft 1 is provided with a radially outwardly projecting annular flange 8 at the transition from the end section 2 into a shaft section 7 that has a greater outer diameter. The shaft section 7 has greater wall thickness than the end section 2, The end section 2 and the shaft section 7 have the same inner diameter so that a receptacle 10 is formed that is designed to receive a shaft S to be inserted into the hollow shaft 1.

The receptacle 10 is axially delimited by an angular shoulder 12 (see FIG. 3) that is provided on the inner wall of the receptacle 10; the shaft to be inserted is resting against this shoulder 12 in the mounted position. The angular shoulder 12 is positioned within the shaft section 7 and ensures that the hollow shaft 1 and the shaft S to be inserted reach their proper mounted position relative to each other.

The clamping ring 6 has a slot 13 penetrating it so that the clamping ring 6 can be widened or contracted. For this purpose, a clamping screw 14 is provided that passes transversely through the slot 13 and extends perpendicularly to the slot faces 15 and 16 that delimit the slot 13 (see FIG. 2). The head 17 of the clamping screw 14 is positioned in a recess 18 in the outer wall surface of the clamping ring 6. The clamping screw 14 is screwed into a threaded opening 19 of the clamping ring 6; the threaded opening 19 opens at the outer wall surface of the clamping ring 6. The head 17 of the clamping screw 14 is resting on a bottom 20 of the recess 18. The head 17 is axially secured by a stop 21 that tangentially penetrates the recess 18 and is arranged such that the clamping screw 14 can be actuated with a tool, for example, a socket wrench. Depending on the turning direction of the clamping screw 14, the clamping ring 6 can be widened or contracted. When spreading apart the clamping ring 6, the stop 21 is an abutment for the clamping screw 14 so that the clamping ring 6 can be widened reliably.

Figure 2:
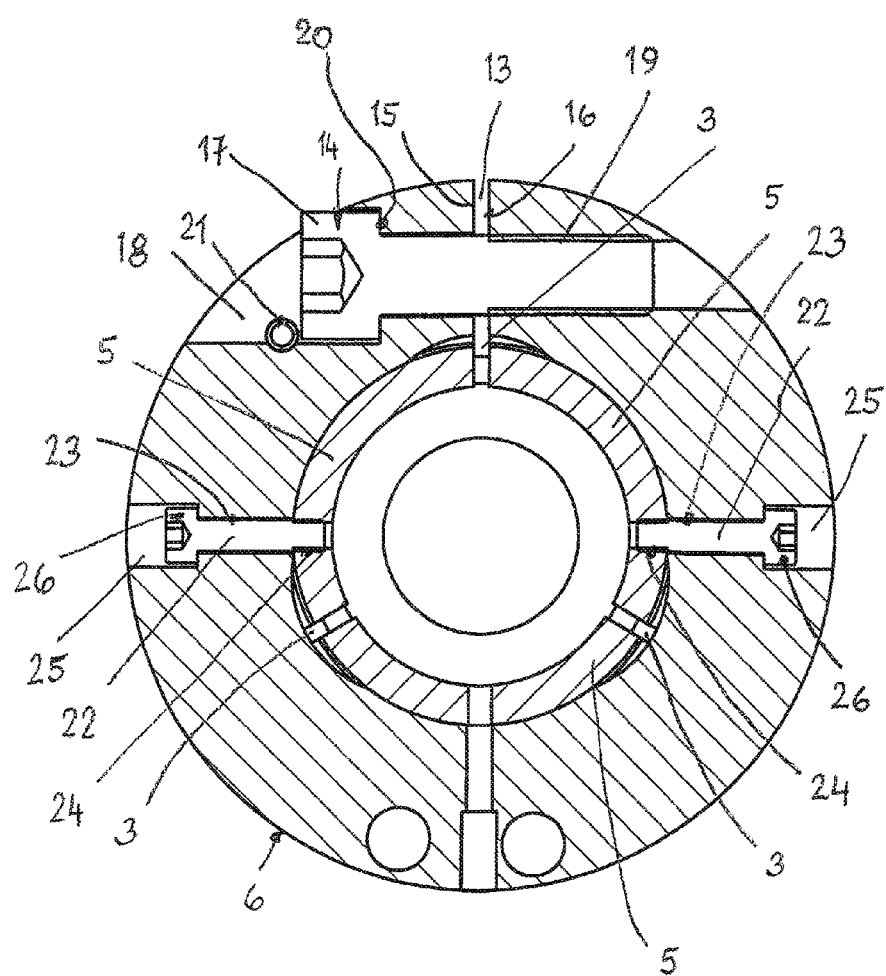
FIG. 2 is a radial section of the clamp coupling according to FIG. 1 in the area of its clamping ring.
Figure 4:
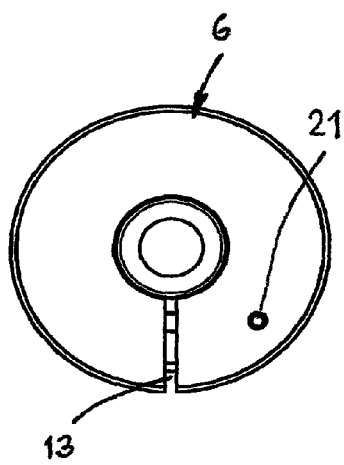
FIG. 4 is an end view of the clamp coupling according to FIG. 3.

A positive-looking (form-fit) connection between the two shafts contributes to a fixed non-rotational connection of the hollow shaft 1 and the inserted shaft. As shown in FIG. 2, the rotational entrainment is provided by means of two fixation elements in the form of fixation screws 22 that are positioned in openings 23 that extend through or penetrate the clamping ring 6 and engage with their free ends threaded openings 24 in two of the coupling segments 5. The threaded openings 24 are advantageously through openings that penetrate the corresponding coupling segments 5. The threaded openings 24 can in principle also be in the form of depressions that are engaged by the fixation screws 22.

In the embodiment according to FIGS. 1 and 2, the two fixation or follower screws 22 are positioned diametrically opposite each other. This position of the fixation screws 22 is however not mandatory. The fixation screws can also be positioned angularly relative to each other. In this connection, also more than two fixation screws 22 can be provided. In principle, however, only one fixation screw 22 is sufficient for connection of the shaft to be coupled with the hollow shaft (hub) 1.

The openings 23 open into the bottom of a recess 25 that has a greater diameter than the opening 23 and opens at the outer wall surface of the clamping ring 6. The fixation screws 22 are positioned in the mounted position within their head 26 at the bottom of the recesses 25.

When the shaft S is to be pushed into the hollow shaft 1, the clamping screw 14 is rotated so that the clamping ring 6 is spread apart. By means of the fixation screws 22, the corresponding coupling segments 5 are entrained and in this way the end section 2 of the hollow shaft 1 is elastically spread apart (widened) in radial direction so that the shaft S can be inserted without problem into the hollow shaft 1. Subsequently, the clamping ring 6 is tightened or contracted by the clamping screw 14. When tightening the screw 14, the coupling segments 5 of the end section 2 of the hollow shaft 1 are elastically deformed inwardly in radial direction and are forced strongly against the circumference of the inserted shaft S. In this way, a frictional torque transmission is achieved. The fixation screws 22 contribute to torque transmission between the inserted shaft S and the hollow shaft 1.

Since the clamping ring 6 must be widened or spread apart for insertion of the shaft, the shaft can be inserted without problems into the receptacle 10 of the hollow shaft 1 even in case of unfavorable tolerance situations, i.e., when the end section 2 of the hollow shaft 1 has the smallest tolerance and the shaft to be inserted the largest tolerance. Since the end section 2 of the hollow shaft 1 can be spread apart, the clamping force that is generated by the clamping ring can be utilized completely for torque transmission between hollow shaft (hub) 1 and the shaft that is inserted.

The fixation screws 22 serve also for axial fixation of the clamping ring 6 on the end section 2. In this way, it is ensured that the clamping ring 6 assumes its optimal position for the clamping action on the end section 2 of the hollow shaft 1.

Figure 3:
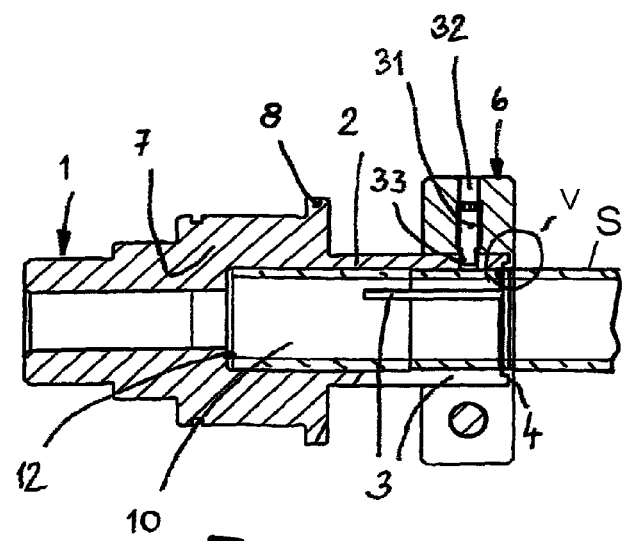
FIG. 3 is an axial section of a second embodiment of the clamp coupling according to the invention.
Figure 5:
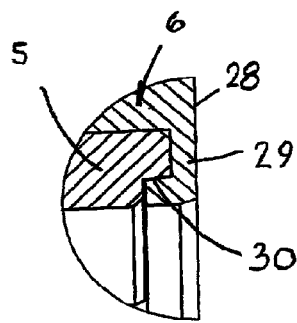
FIG. 5 shows in enlarged illustration the detail V of FIG. 3.
Figure 6:
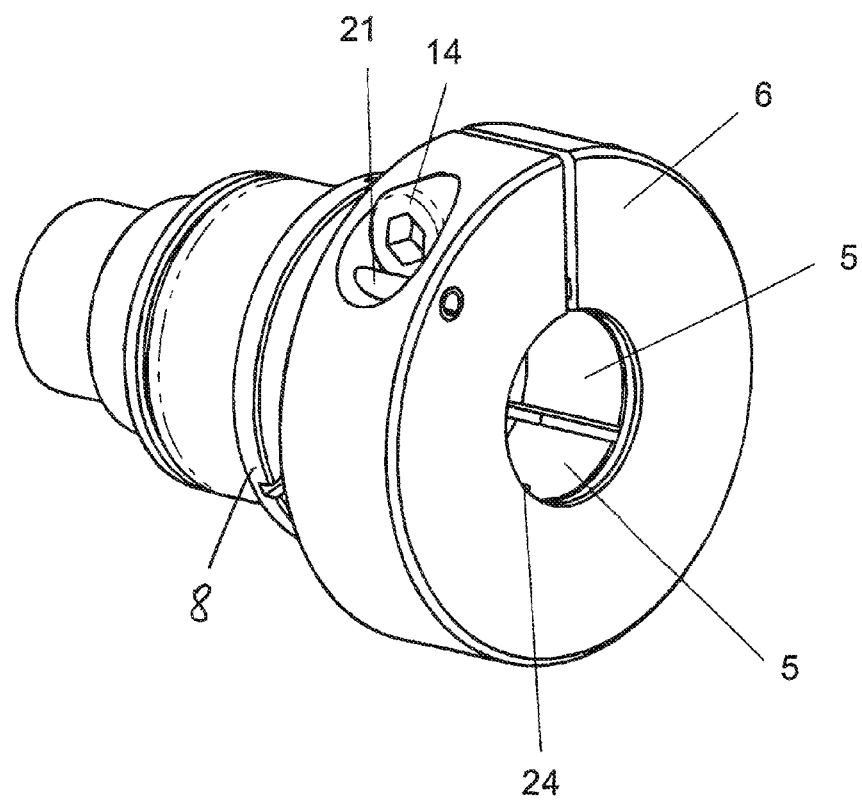
FIG. 6 is a perspective illustration of the clamp coupling according to FIG. 3.

In the embodiment according to FIGS. 3 to 6, the entrainment of the coupling segments 5 when spreading apart the clamping ring 6 is provided by a profile part 29 that is provided on the inner side of the clamping ring 6 in the area of its end face 28 facing away from the shaft section 7 (FIG. 3 and FIG. 5). The profile part 29 has in axial section an L-shaped profile and engages about the end face of the coupling element 5. The coupling elements 5 are provided at their corresponding end face with a recess 30 extending about their circumferential length and open inwardly in radial direction; the angled end of the profile part 29 engages this recess 30. With this positive locking or form-fit action it is achieved that the coupling elements 5 are entrained upon spreading apart the clamping ring 6.

For axial securing of the clamping ring 6 on the end section 2 with the coupling segments 5, at least one fixation screw 31 is provided that is screwed into a threaded bore 32 of the clamping ring 6 and with its tapering end projects into an opening 33 in one of the coupling segments 5.

The clamp coupling according to FIGS. 3 to 6 operates in other respects in the same way as the embodiment according to FIGS. 1 and 2.

The specification incorporates by reference the entire disclosure of German priority document 10 2011 013 887.0 having a filing date of Mar. 7, 2011.

While specific embodiments of the invention have been shown and described in detail to illustrate the inventive principles, it will be understood that the invention may be embodied otherwise without departing from such principles.

What is claimed is:

1. A frictional clamp coupling comprising:
a first rotatable part;
a slotted single-part clamping ring, seated on said first rotatable part, provided with a single slot penetrating said clamping ring so that said clamping ring has opposed first and second ends with facing slot faces and is adapted to be elastically spread apart or contracted at said first and second ends;
a stop arranged and fastened in said clamping ring;
a clamping screw arranged in said clamping ring so as to pass transversely through the slot, wherein a head of the clamping screw is positioned in a recess at the first end of the clamping ring and a threaded end of the clamping screw is screwed into a threaded opening of the second end of the clamping ring;
said clamping screw acting on said clamping ring to elastically spread said clamping ring apart outwardly in a radial spreading-apart direction and contract said clamping ring inwardly in a radial contracting direction, depending on a turning direction of said clamping screw;
said stop axially securing said clamping screw and forming an abutment for said head of said clamping screw when said clamping screw acts on said clamping ring so as to elastically spread said clamping ring apart in the radial spreading-apart direction;
said first rotatable part comprising a shaft section and an end section, the end section provided with axially oriented slots that extend up to a free end face of said first rotatable part and that separate coupling segments of said first rotatable part from each other within said end section;
said axially oriented slots and said coupling elements arranged in an area surrounded by said clamping ring;
said coupling segments configured to receive a second rotating part and to be clamped by said clamping ring on the second rotating part by being elastically deformed radially inwardly;
at least one follower part arranged on said clamping ring;
wherein said at least one follower part in the radial spreading-apart direction of said clamping ring is fixedly connected with at least a first one of said coupling segments;
wherein, when said clamping ring is spread apart, said at least one follower part is moved by the clamping ring in the radial spreading-apart direction and entrains said first coupling segment and widens said first rotatable part in the radial spreading-apart direction.

2. The clamp coupling according to claim 1, wherein said at least one follower part is a follower screw arranged in said clamping ring and wherein said first coupling segment has a threaded opening into which said follower screw is screwed.

3. The clamp coupling according to claim 1, wherein said at least one follower part is in the form of at least one profile part that is provided at said free end face on said clamping ring.

4. The clamp coupling according to claim 3, wherein said clamping ring engages across an end face of said first coupling segment.

5. The clamp coupling according to claim 1, wherein said clamping ring is secured by at least one fixation element on said first rotatable part.

6. The clamp coupling according to claim 5, wherein said at least one fixation element is formed by said at least one follower part.

7. The clamp coupling according to claim 5, wherein said at least one fixation element is a follower screw that is supported in said clamping ring and has a free end that engages an opening of said first coupling segment.

8. The clamp coupling according to claim 1, wherein said head of said clamping screw is positioned in a recess in an outer wall surface of said clamping ring.

9. The clamp coupling according to claim 8, wherein said head of said clamping screw is positioned between a bottom of said recess and said stop, said stop positioned in said recess.

10. The clamp coupling according to claim 9, wherein said stop is a pin that penetrates said recess transversely to an axis of said clamping screw.

11. A frictional clamp coupling comprising:
a first rotatable part;
a slotted clamping ring seated on said first rotatable part;
a stop arranged and fastened in said clamping ring;
a clamping screw arranged in said clamping ring and acting on said clamping ring to elastically spread said clamping ring apart outwardly in a radial spreading-apart direction and contract said clamping ring inwardly in a radial contracting direction, depending on a turning direction of said clamping screw;
said stop axially securing said clamping screw and forming an abutment for a head of said clamping screw when said clamping screw acts on said clamping ring so as to spread said clamping ring apart in the radial spreading-apart direction;
said first rotatable part having axially oriented slots that extend up to a free end face of said first rotatable part and that separate coupling segments of said first rotatable part from each other;
said axially oriented slots arranged in an area surrounded by said clamping ring;
said coupling segments configured to receive a second rotating part and to be clamped by said clamping ring on the second rotating part;
at least one follower part arranged on said clamping ring;
wherein said at least one follower part in the radial spreading-apart direction of said clamping ring is fixedly connected with at least a first one of said coupling segments;
wherein, when said clamping ring is spread apart, said at least one follower part is moved by the clamping ring in the radial spreading-apart direction and entrains said first coupling segment and widens said first rotatable part in the radial spreading-apart direction;
wherein said at least one follower part is in the form of at least one profile part that is provided at said free end face on said clamping ring;
wherein said clamping ring engages across an end face of said first coupling segment;
wherein said end face of said first coupling segment has a recess arranged at a radial inner side of said first coupling segment and said profile part of said clamping ring has an angled end that engages said recess and entrains said first coupling segment in the radial spreading-apart direction when said clamping ring is spread apart.

12. The clamp coupling according to claim 11, wherein said recess of said first coupling segment is open inwardly in a radial direction of said first rotating part.

13. A clamp coupling comprising:
a first rotatable part;
a slotted single-part clamping ring, seated on said first rotatable part, provided with a single slot penetrating said clamping ring so that said clamping ring has opposed first and second ends with facing slot faces and is adapted to be elastically spread apart or contracted at said first and second ends;
a clamping screw arranged in said clamping ring so as to pass transversely through the slot, wherein a head of the clamping screw is positioned in a recess at the first end of the clamping ring and a threaded end of the clamping screw is screwed into a threaded opening of the second end of the clamping ring;
said clamping screw acting on said clamping ring to elastically spread said clamping ring apart in a radial spreading-apart direction and contract said clamping ring inwardly in a radial contracting direction, depending on a turning direction of said clamping screw;
said first rotatable part comprising a shaft section and an end section, the end section provided with axially oriented slots that extend up to a free end face of said first rotatable part and that separate coupling segments of said first rotatable part from each other within said end section;
said axially oriented slots and said coupling elements arranged in an area surrounded by said clamping ring;
said coupling segments configured to receive a second rotating part and to be clamped by said clamping ring on the second rotating part by being elastically deformed radially inwardly;
at least one follower part arranged on said clamping ring;
wherein said at least one follower part in the radial spreading-apart direction of said clamping ring is fixedly connected with at least a first one of said coupling segments so as to entrain said first coupling segment and widen said first rotatable part in said radial spreading-apart direction when said clamping ring is spread apart;
wherein said head of said clamping screw is positioned in a recess in an outer wall surface of said clamping ring;
a stop disposed in said recess and interacting with said head of said clamping screw to axially secure said clamping screw, said stop forming an abutment for said head of said clamping screw when said clamping screw acts on said clamping ring so as to spread said clamping ring elastically apart in the radial spreading-apart direction.

14. The clamp coupling according to claim 13, wherein said head of said clamping screw is positioned between a bottom of said recess and said stop.

15. The clamp coupling according to claim 13, wherein said stop is a pin that penetrates said recess transversely to an axis of said clamping screw.

* * * * *